(12) United States Patent
Córdova Opazo et al.

(10) Patent No.: US 11,834,314 B2
(45) Date of Patent: Dec. 5, 2023

(54) VERTICAL MANIPULATOR FOR LARGE SIZE TYRES WHICH COMPRISES A PLATFORM AND MECHANISMS FOR HOLDING, RAISING AND ROTATING TYRES FOR THE SAFE WORKING OF MAINTENANCE WORKERS

(71) Applicant: FMA INDUSTRIAL CHILE S.A., Santiago (CL)

(72) Inventors: Héctor Córdova Opazo, Antofagasta (CL); Elías Sanhueza Sánchez, Santiago (CL)

(73) Assignee: FMA INDUSTRIAL CHILE S.A., Santiago (CL)

( * ) Notice: Subject to any disclaimer, the term of this patent is extended or adjusted under 35 U.S.C. 154(b) by 47 days.

(21) Appl. No.: 17/441,062

(22) PCT Filed: Mar. 26, 2020

(86) PCT No.: PCT/IB2020/052856
§ 371 (c)(1),
(2) Date: Sep. 20, 2021

(87) PCT Pub. No.: WO2020/194226
PCT Pub. Date: Oct. 1, 2020

(65) Prior Publication Data
US 2022/0177287 A1   Jun. 9, 2022

(30) Foreign Application Priority Data
Mar. 26, 2019  (CL) .................................. 0795-2019

(51) Int. Cl.
*B66F 9/18*    (2006.01)

(52) U.S. Cl.
CPC ...................................... *B66F 9/18* (2013.01)

(58) Field of Classification Search
CPC ....... B66F 9/127; B60B 29/00; B60B 29/001; B60B 29/002; B60B 30/00; B60B 30/02; B60B 30/04
See application file for complete search history.

(56) References Cited

U.S. PATENT DOCUMENTS

| | | | | |
|---|---|---|---|---|
| 5,383,758 A | * | 1/1995 | Patrick | B66F 9/061 414/10 |
| 9,573,420 B2 | * | 2/2017 | Hedley | B66F 7/22 |

(Continued)

OTHER PUBLICATIONS

International Search Report dated Jun. 2, 2020 re: application No. PCT/IB2020/052856, pp. 1-2.

*Primary Examiner* — Mark C Hageman
(74) *Attorney, Agent, or Firm* — CANTOR COLBURN LLP

(57) ABSTRACT

A vertical manipulator for large size tyres which includes a platform and mechanisms for holding, raising, and rotating tyres, for the safe working of maintenance workers. The vertical manipulator works on all types of terrain and its movements include those of conventional manipulators, in addition to others specific to the invention, rendering its features superior. The vertical manipulator includes a main transverse body from which are suspended two sets of parallel arms that open and close according to the size of the tyre. To each set of parallel arms is added a support arm, which holds a pivoting arm, equipped with a gripping plate, securing side rollers and a lower roller, the pivoting arm operating supported by a lifting jack, and a work platform being disposed on the parallel arms and supported by the main body.

7 Claims, 4 Drawing Sheets

(56) References Cited

U.S. PATENT DOCUMENTS

| | | |
|---|---|---|
| 2005/0016663 A1 | 1/2005 | Lockridge et al. |
| 2009/0155032 A1 | 6/2009 | Hedley et al. |
| 2010/0166531 A1* | 7/2010 | Bauer .................... B66F 9/183 414/429 |
| 2011/0197416 A1* | 8/2011 | Hedley .................. B60B 30/00 414/469 |
| 2014/0288702 A1* | 9/2014 | Salamanca ............. B23P 19/06 901/15 |
| 2014/0314536 A1 | 10/2014 | Hedley et al. |
| 2016/0152102 A1 | 6/2016 | Campbell |

* cited by examiner

VERTICAL MANIPULATOR FOR LARGE SIZE TYRES WHICH COMPRISES A PLATFORM AND MECHANISMS FOR HOLDING, RAISING AND ROTATING TYRES FOR THE SAFE WORKING OF MAINTENANCE WORKERS

TECHNICAL FIELD

The disclosure relates to a vertical manipulator for large size tyres which comprises a platform and mechanisms for holding, raising and rotating tyres, for the safe working of maintenance workers.

BACKGROUND

One of the frequent maintenance tasks carried out in earth-moving equipment is changing tyres due to the wear and faults they experience. The large dimensions of the tyres cause this task to be a risky activity and involve considerable time to carry out; therefore, the methods, equipment and tools must be optimal in terms of safety (to safeguard the integrity of maintenance workers) and response time (to maximise earth-moving equipment productive time).

Conventional tyre manipulators are implements installed in carrier machines which can be forklifts or front loaders, in which the original implements, whether the forks in forklifts or buckets in loaders, are removed and the tyre manipulator is installed according to the loading capacity needed and available in the machine. For some cases of manipulators assembled on front loaders, assembling a mast similar to the mast of forklifts is required. There are also tyre manipulators assembled on articulated cranes which in turn are assembled on trucks for on-road type trucks.

The typical movements of conventional manipulators are:
- Opening and closing of arms to grab a finite range of tyres (according to the capacity of the carrier and of the manipulator).
- Laterally (transversely) moving the main body for assembly adjustment.
- Rotating the main body for assembly adjustment.
- Rotating the plate of each arm (two in total) grabbing the tyre, so that the tyre goes from the vertical position to the horizontal position when rotated, or vice versa, that is, taking it from its service position on the truck and to a stacking (ground) position, or vice versa.
- Lifting.
- Transferring.

There are two modalities for the tyre changing operation. The first consists of taking off the tyre and the rim as a complete set from the final drive of the earth-moving equipment, which involves loosening all the nuts attaching the rim to the final drive and taking the extracted set to a press to disassemble the tyre from the rim. The other method is known as "vertical assembly", since it contemplates disassembling only the tyre; to that end, the tyre must be detached from the rim with help of tools called "debeaders", to then extract the tyre after having removed all the securing rings of the rim.

In both methods, a conventional tyre manipulator is used, which manipulator at all times has the tyre grabbed with its arms and imparts to it all the movements needed for its proper manipulation, namely, lifting, vertical-horizontal positioning, rotation of main body for adjusting shim for bolts, transferring and stacking.

Both methods contemplate the maintenance workers directly intervening in some tasks such as loosening/placing nuts, removing placement of securing rings, assembling/disassembling the valve, among others. For these interventions, maintenance workers install stairs and work platforms manually in an area confined by the arms holding the tyre, running high risks such as being trapped by a falling tyre (which may cause death) in the event of the arm mechanism failing, injuries from handling heavy tools and accessories for long periods of time and falls from different levels.

Several manufacturers of manipulators have been implementing elements in the form of stops or supports to prevent the tyre from crushing maintenance workers in the event of the arm mechanism failing as they prevent the tyre from turning over. However, maintenance workers still work in an unsafe area as they are right in the middle of the radius of action of a machine with a large span, such as a tyre manipulator, and have little visual contact with the operator of said manipulator. Furthermore, heavy stairs and platforms are still installed manually, which can also cause the intervention to be slow and tedious.

A manipulator model differing from conventional manipulators has emerged on the market in recent years. It is an autonomous manipulator equipment, which does not need a carrier, moving on its own four wheels. Its fundamental application is for removing/placing the tyre with the rim in workshops with an even and compact floor (concrete slab) for the purpose of intervening on the final drive of the earth-moving equipment (not for maintenance due to tyres). Accordingly, it cannot be used for a vertical disassembly of the tyre which contemplates leaving the rim on the final drive of the truck, since it does not have the appropriate power this requires, nor can it work in workshops having a floor that is not very compact or be stacked or cover significant distances. Its movements consist of tyre rotation for adjusting holes by means of lower rollers, movement and steering. As of recently, it is also possible to find on the market autonomous equipment that works similarly to that described above but adding a tyre pivoting movement from the vertical position to the horizontal position and vice versa; however, it cannot be used for vertical disassembly of the tyre either which leaves the rim on the final drive of the truck, nor can it stack tyres or cover significant distances.

SUMMARY

The present disclosure relates to a vertical manipulator comprising a main transverse body from which are suspended two sets of parallel arms that open and close according to the size of the tyre to be grabbed. To each set of parallel arms is added a support arm, which holds a pivoting arm, equipped with a grabbing plate, securing side rollers and a lower roller. A work platform is disposed on the parallel arms and supported by the main body. The movement of the pivoting arm is achieved because the support arm is supported by a lifting jack, in order to leave the tyre horizontally on the ground without endangering the balance of the carrier machine.

The vertical tyre manipulator is designed for the vertical assembly/disassembly of tyres of earth-moving equipment, the features of which solve safety issues for maintenance workers and reduce the assembly/removal task execution time.

The reduction of the execution time is achieved because a work platform incorporated in the manipulator has been disposed; therefore, maintenance workers do not have to use time to prepare the work area; for the work platform to be close to the tyre, at the suitable height and grabbing the tyre by means of the gripping plates at the level of the axis of symmetry of the final drive of the earth-moving equipment, there have been incorporated pivoting arms which are equipped with the tyre gripping plates; this is the same as saying that the manipulator lowers and lifts only the pivoting arms which support the gripping plates.

The improved safety resides in the fact that there is better visual contact between the operator of the manipulator and the maintenance workers who are on the platform, and in that maintenance workers are on a platform and not on stairs (a larger area). Conventional manipulators work at the level of the axis of symmetry of the final drive, so the main body of the tyre manipulator, which is parallel to the earth-moving equipment, prevents the operator of the tyre manipulator from having visual contact with maintenance workers. The present disclosure solves this problem because the entire manipulator is lower than the axis of symmetry of the final drive of the earth-moving equipment and only the pivoting arms are raised and grab the tyre with the gripping plates on the sides, or in other words, by the tread of the tyre. Another safety aspect is that the pivoting arms have securing rollers that clamp the tyre between the front and rear face, which allows ensuring that the tyre remains vertical while being grabbed by the manipulator, and each pivoting arm also has a lower roller for supporting the tyre. This assures that maintenance workers will not run any risks of being crushed.

Moreover, the pivoting arms allow, once the tyre has been removed, the extracted tyre to be stacked upon being returned to the horizontal or semi-horizontal position, according to whatever the tyre stacking custom may be; this latter function cannot be done by an autonomous manipulator, which only works with the tyre in the vertical position.

Given that the manipulator is assembled in a powerful carrier machine, it can perform vertical disassembly without any problems and travel over any type of terrain.

As a result of the platform being an improved work space, when the extraction/placement of nuts (extraction of the rim) is performed, it is easier for maintenance workers to work; furthermore, the platform is useful for inspecting the tyre when it has already been extracted and is on the floor in the horizontal position. In turn, the pivoting arms have lower rollers which are adjusted according to the diameter of the tyre in order to support and rotate it, such that the operator can be in a single position with the nut placement/extraction tool suspended by a support arm called "weightless" available on the market, so the maintenance worker does not have to hold the tool at all times.

As a result of the lifting jacks and pivoting arms, the vertical manipulator can leave the tyre in the horizontal position at the ground level and, consequently, work with the same features as conventional manipulators; that is, when the arms are in the horizontal position, it can do the same thing that conventional manipulators do, and the additional components such as rollers and platform do not prevent movements from being performed. Lifting jacks are vital for not compromising the static balance of the carrier machine.

BRIEF DESCRIPTION OF THE DRAWINGS

Four figures are attached to explain the present disclosure, namely.

DETAILED DESCRIPTION OF THE DRAWINGS

Figure 1:
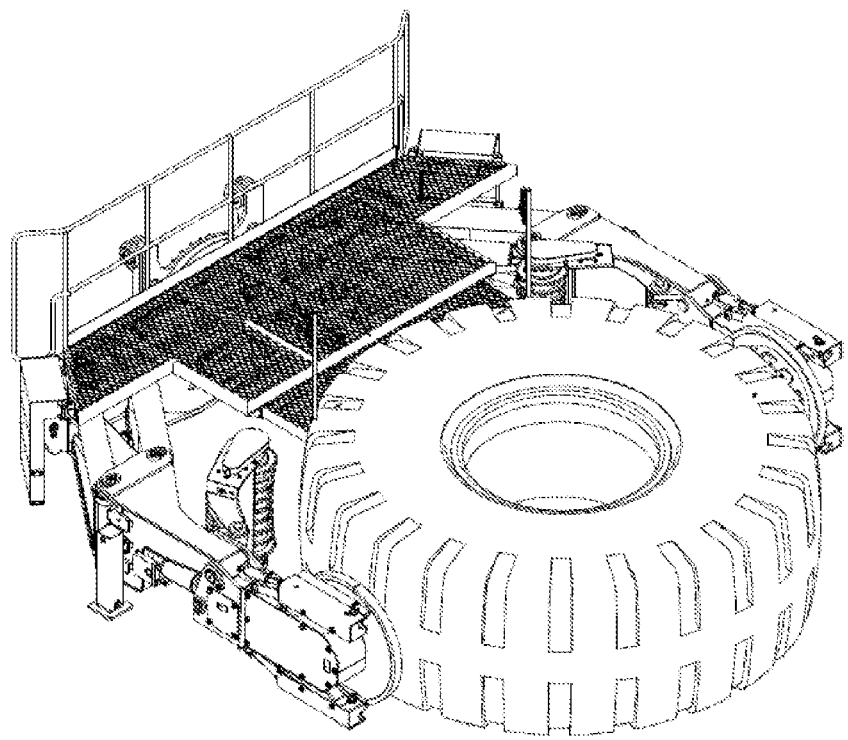
FIG. 1 shows a perspective view of the disclosure, with the arms extended or in the horizontal position, grabbing the tyre.
Figure 2:
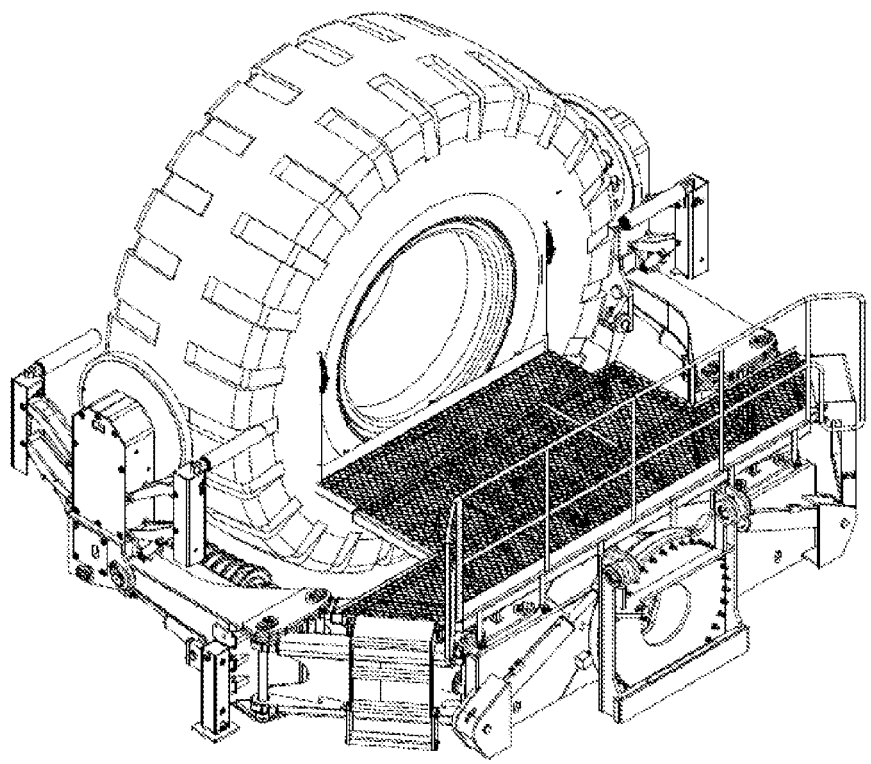
FIG. 2 shows a perspective view of the disclosure, with the arms pivoted 90° or in the vertical position, grabbing the tyre.
Figure 3:
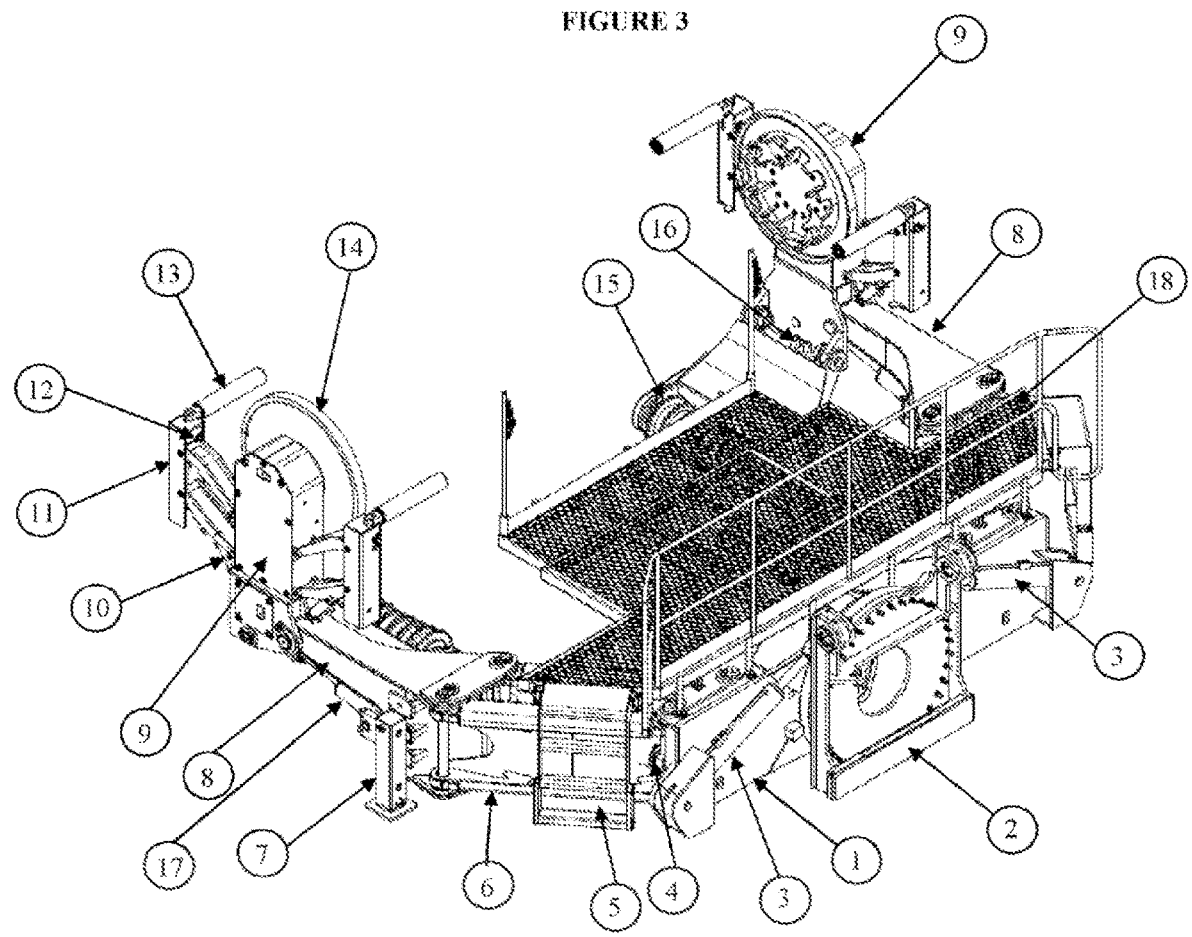
FIG. 3 shows a perspective view of the disclosure for the purpose of disclosing its main parts.

FIG. 3 shows the manipulator in the vertical position, where the main body 1, which rotates with respect to the support 2 by means of two hydraulic cylinders opposite 3, can be seen. The main body 1 supports two sets of opposite parallel arms 6 with respect to the axis of symmetry of the disclosure, equipped with hydraulic cylinders 4 for achieving the opening and closing of the support arms 8. The support arms 8 hold the pivoting arms 9 and are equipped with hydraulic pivoting cylinders 17, whereby the arms 9 can go from vertical to horizontal and vice versa; each support arm 8 is likewise equipped with a lifting jack 7. In turn, each pivoting arm 9 has a gripping plate 14, two sets of securing rollers 11 and a rotating roller 15 equipped with a pivoting cylinder 16. Each gripping plate 14 rotates about its axis as a result of an internal motorisation. The sets of securing rollers 11 are each equipped with a securing roller 13, an opening cylinder 10 and a roller rotating cylinder 12. In the lower part of each arm 9 there is a rotating roller 15, which rotates about its axis by means of an internal motorisation. Supported by the main body 1 and on the parallel arms 6, there is a work platform 18 equipped with access stairs 5 at each end.

Figure 4:
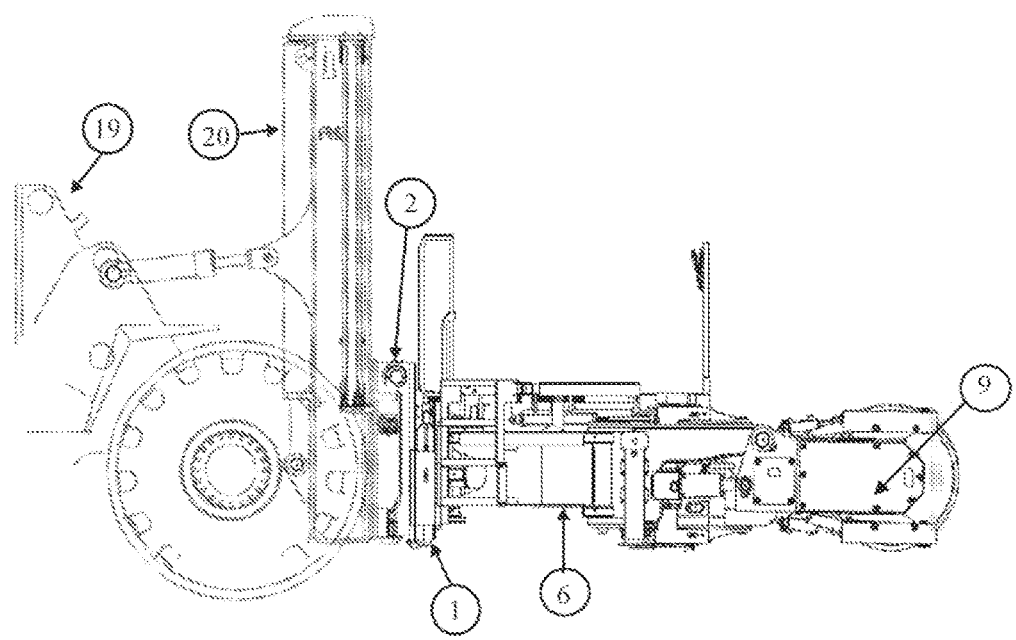
FIG. 4 shows a profile view of the disclosure.

FIG. 4 shows a profile view of the vertical manipulator in order to show the carrier machine 19, which is equipped with a mast 20 to which the support 2 is coupled.

Figure 5:
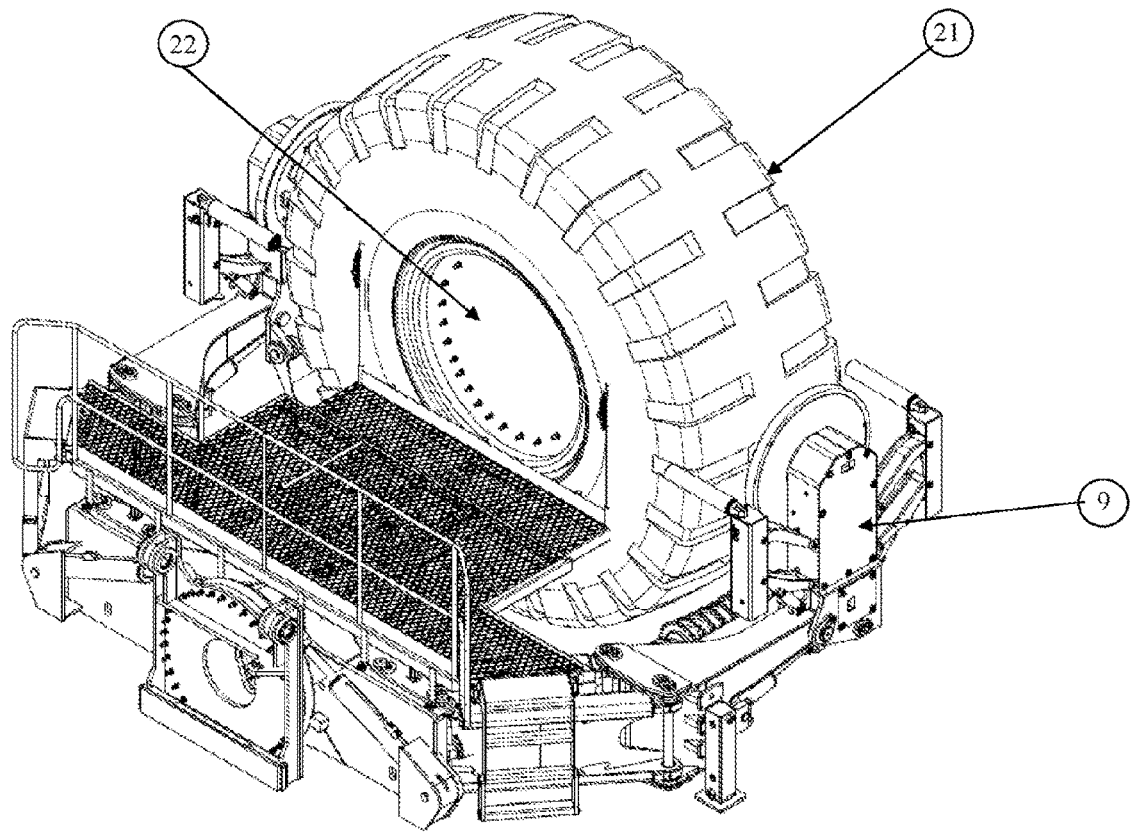
FIG. 5 shows a perspective view of the disclosure in the vertical work position.

The vertical manipulator with the arms 9 in the vertical work position can be seen in FIG. 5, where the rim 22 and the tyre 21 grabbed by the arms 9 can be seen.

Figure 6:
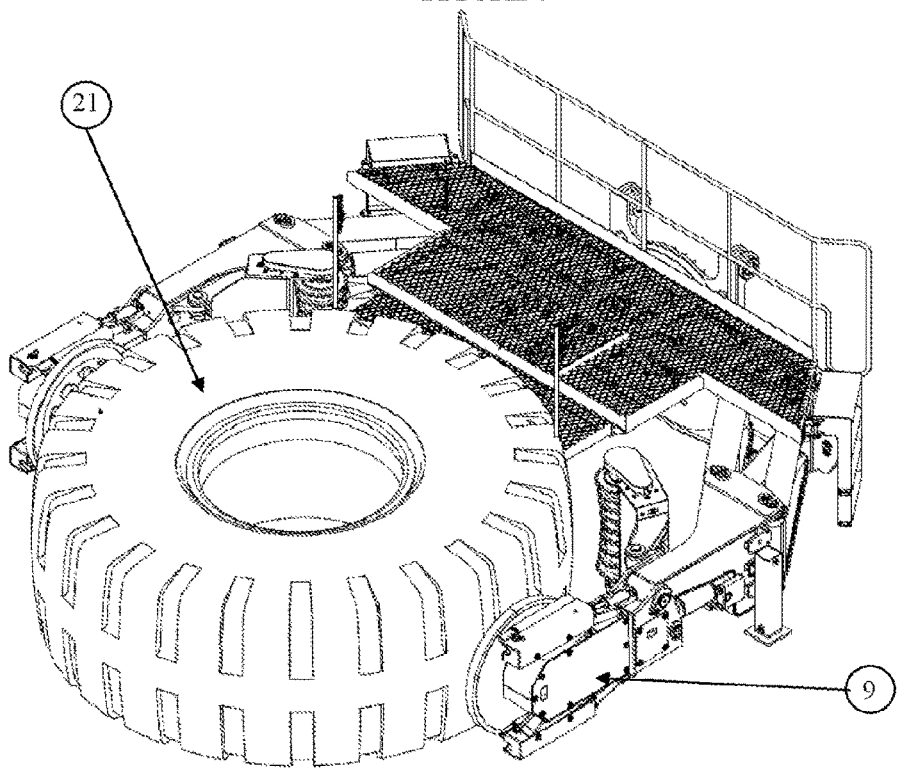
FIG. 6 shows the vertical manipulator with the arms 9 in the horizontal work position.

The vertical manipulator with the arms 9 in the horizontal work position, grabbing the tyre 21 without a rim, available for internal inspection, can be seen in FIG. 6.

Figure 7:
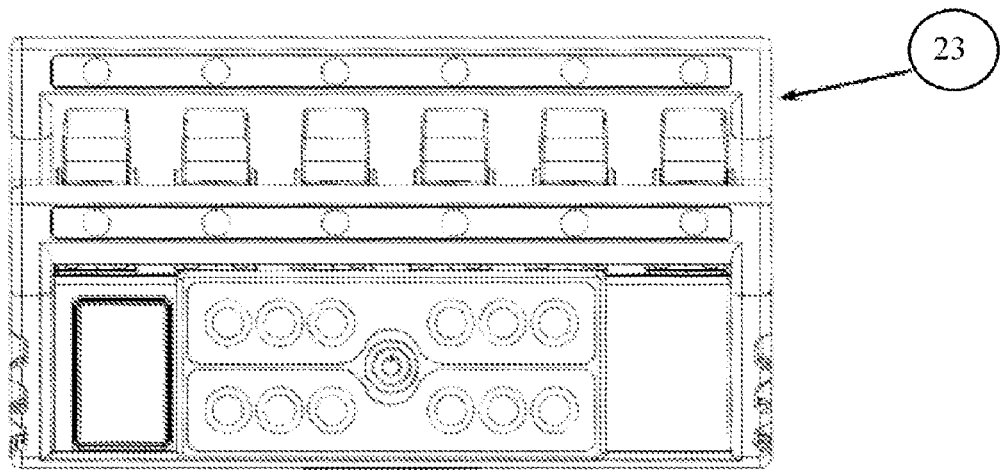
FIG. 7 shows the remote control.

Observed in FIG. 7 is the remote control 23 of the equipment with which the operator performs all the movements, whereby the operator can move close enough to achieve seeing the fine movements required and move away enough to be in a safe work area.

The operation of the vertical manipulator will be described based on the tasks that can be performed by means of the use thereof.

Extraction of Tyre with Rim:

First, the operator of the vertical manipulator must ensure that the earth-moving equipment in which the tyre is going to be changed is stopped, the tyre 21 on which the intervention is to take place lifted and the brake thereof released. In turn, the arms 9 must be in the vertical position, otherwise the lifting cylinders 17 must be actuated and the arms 9 taken to the lifting stop. Then the parallel arms 6 must be opened/closed by actuating the opening/closing cylinders 4, according to the size of the tyre 21 to be grabbed (the opening must be slightly larger than the size of the tyre), and the vertical manipulator must also be lowered by activating the mast 20 to such a height that it allows the rotating rollers 15 to pass below the tyre 21 and at the same time the gripping plates to grab the tyre 21 at the centre thereof. Next the carrier machine 19 must be moved closer such that the rollers 15 are below the tyre 21 completely, and then the pivoting cylinders 16 of the rollers 15 must be actuated in order to contact the tyre 21. Once the vertical manipulator has been positioned, the opening cylinders 10 of each set of securing rollers 11 must be activated until the securing rollers 13 surpass the tread width of the tyre 21; then the roller rotating cylinder 12 of each set 11 is activated and the tyre 21 is clamped with the securing rollers 13. The support jacks 7 must be activated for proper stability of the vertical manipulator. Once the tyre 21 is secured, maintenance workers can enter the platform 18 to extract the nuts from the rim 22. Once the nuts have been taken out, maintenance workers must get off the platform 18, the operator of the vertical manipulator must collect the lifting jacks 7 and remove the tyre 21 with the rim 22 and transfer it to the salvage workshop. Then a new tyre 21 with the rim 22 must be grabbed and the inverse of what has been described above is performed to assemble said tyre on the earth-moving machine.

Extraction of Only the Tyre (Vertical Assembly/Disassembly):

The method is very similar except for the following methods: the tyre 21 must be debeaded or detached from the rim 22. Once the rollers 15 are completely below the tyre 21, the gripping plates 14 must tighten said tyre in order to grab it and remove it from the rim 22; the rotating rollers 15 are not required to be abutting against the tyre 21 since the tyre 21 will not be rotated. The nuts are not required to be extracted from the rim 22, and the lifting jacks 7 are not required to be applied either. Once the tyre has been removed, the operator must leave the tyre 21 on the ground in the horizontal position to be inspected by maintenance workers; to that end, the lifting jacks 7 must be applied and the lifting cylinders 17 activated; maintenance workers must get up on the platform 18 and access the tyre 21 from there; from the platform 18, maintenance workers can suspend lifelines, provided that the width of the tyre 21 generates sufficient height to require a lifeline for maintenance workers.

The invention claimed is:

1. A vertical tyre manipulator for changing tyres of earth-moving equipment or off-road equipment, the vertical tyre manipulator comprising:
   a main body having a support attachable to a carrier machine,
   wherein the main body has a working platform configured such that workers are able to stand on the working platform,
   wherein the main body has two arms placed at opposite sides of the main body,
   wherein each arm is equipped with a hydraulic cylinder and with a support arm,
   wherein each support arm comprises: a lifting jack, a lifting cylinder, and two sets of rollers,
   wherein each support arm supports a pivoting arm, which are pivotable from a vertical position to a horizontal position and from a horizontal position to a vertical position,
   wherein each support arm is configured to operate supported by the lifting jack, and
   wherein the pivoting arms are pivotable with respect to the support arm which is supported by the respective lifting cylinder.

2. The vertical tyre manipulator for changing tyres of earth-moving equipment according to claim 1, wherein the sets of rollers are each equipped with a securing roller, an opening cylinder and a roller pivoting cylinder.

3. The vertical tyre manipulator for changing tyres of earth-moving equipment according to claim 2, wherein the rollers are configured to be adjusted to a tyre as a result of the opening cylinder and to the roller pivoting cylinder, they can rotate freely due to contact with the tyre without friction, upon actuating the rollers.

4. The vertical tyre manipulator for changing tyres of earth-moving equipment according to claim 2, wherein several measurements of tyres can be covered by the action of the opening cylinder.

5. The vertical tyre manipulator for changing tyres of earth-moving equipment according to claim 1, wherein the vertical tyre manipulator is controllable by a remote control.

6. The vertical tyre manipulator for changing tyres of earth-moving equipment according to claim 1, wherein the working platform is equipped with at least one access stair.

7. The vertical tyre manipulator for changing tyres of earth-moving equipment according to claim 1, wherein the main body is rotatable with respect to the support.

* * * * *